US008167719B2

(12) United States Patent
Cha

(10) Patent No.: US 8,167,719 B2
(45) Date of Patent: May 1, 2012

(54) METHOD FOR PROVIDING AUDIO GAME, APPARATUS AND COMPUTER-READABLE RECORDING MEDIUM WITH PROGRAM THEREFOR

(75) Inventor: Seung-hee Cha, Seoul (KR)

(73) Assignee: Neowiz Games Co., Ltd. (KR)

( * ) Notice: Subject to any disclaimer, the term of this patent is extended or adjusted under 35 U.S.C. 154(b) by 233 days.

(21) Appl. No.: 12/534,477

(22) Filed: Aug. 3, 2009

(65) Prior Publication Data

US 2010/0035685 A1    Feb. 11, 2010

(30) Foreign Application Priority Data

Aug. 5, 2008  (KR) .................. 10-2008-0076496

(51) Int. Cl.
*A63F 9/24* (2006.01)
(52) U.S. Cl. ............... 463/35; 463/7; 463/30; 463/31; 463/43
(58) Field of Classification Search .......... 463/7, 42, 463/30, 35
See application file for complete search history.

(56) References Cited

U.S. PATENT DOCUMENTS

| 5,886,273 | A * | 3/1999 | Haruyama ............ 84/478 |
| 6,388,181 | B2 * | 5/2002 | Moe .................. 84/477 R |
| 6,390,923 | B1 * | 5/2002 | Yoshitomi et al. ...... 463/43 |
| 7,212,213 | B2 * | 5/2007 | Steinberg et al. ...... 345/589 |

FOREIGN PATENT DOCUMENTS

| JP | 2001-312258 | 11/2001 |
| JP | 2002-244652 | 8/2002 |
| JP | 2002-369944 | 12/2002 |
| JP | 2005-198974 | 7/2005 |
| JP | 2006-023483 | 1/2006 |
| JP | 2006-192157 | 7/2006 |
| KR | 10-2004-0018224 | 3/2004 |
| KR | 10-2005-0117808 | 12/2005 |

OTHER PUBLICATIONS

"Quendan" ("Osu! Tatakae! Quendan!"), Main Trailer, 2006, http://www.youtube.com/watch?v=-_Z85RIYYRA, referenced also on Wikipedia at http://en.wikipedia.org/wiki/Osu?_Tatakae?_Ouendan.*

* cited by examiner

*Primary Examiner* — Omkar Deodhar
(74) *Attorney, Agent, or Firm* — Harness, Dickey & Pierce, P.L.C.

(57) ABSTRACT

A method for providing an audio game, apparatus and computer-readable recording medium with program therefor are provided. The game apparatus is disclosed having a touch screen for generating player selected music and its music related tracks on which a number of index marks are arranged in a predetermined pattern in relation to the music and a timeline is moved in a predetermined direction until it overlaps with the arranged index marks, and when a positional value is received corresponding to the index marks from the touch screen by the player's performance a preset performance sound that corresponds to its index mark is produced.

21 Claims, 13 Drawing Sheets

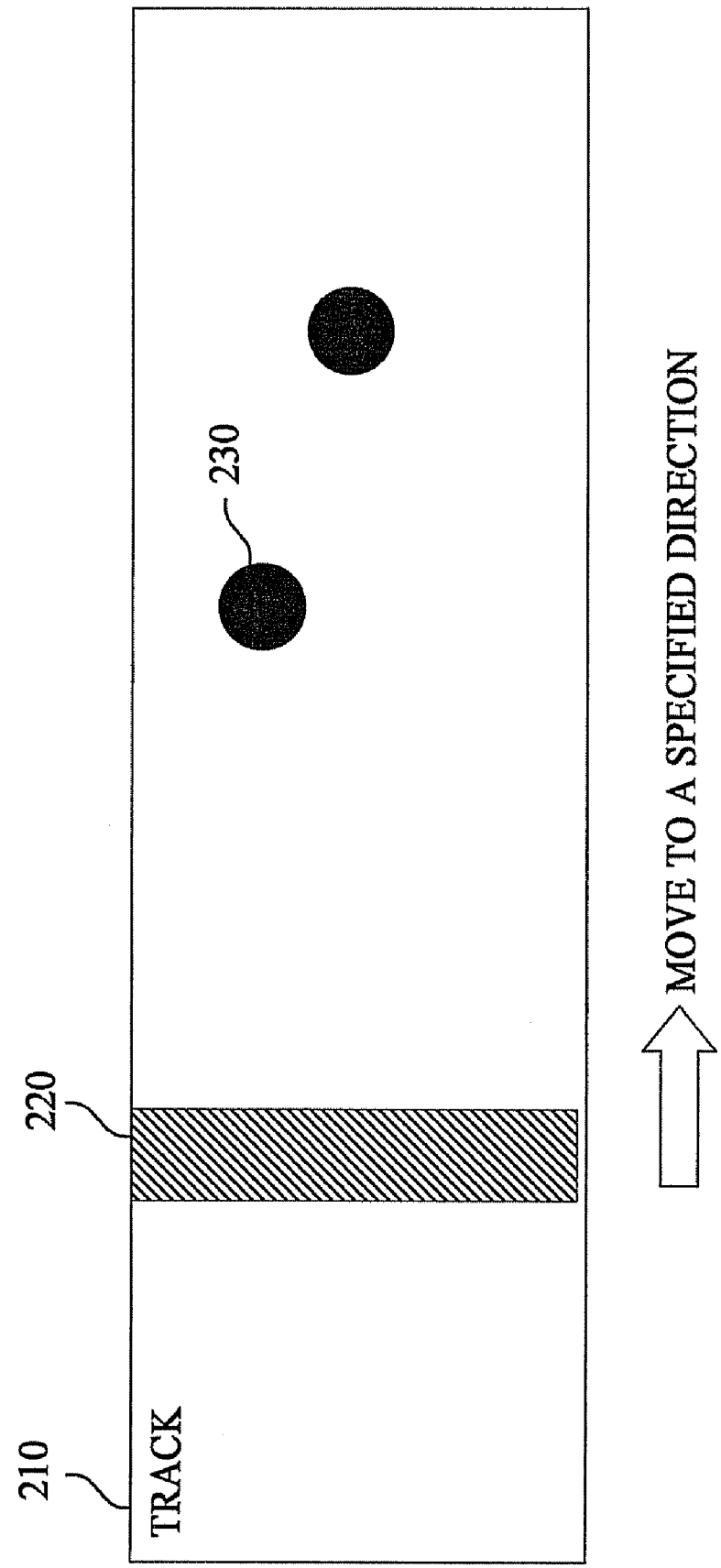

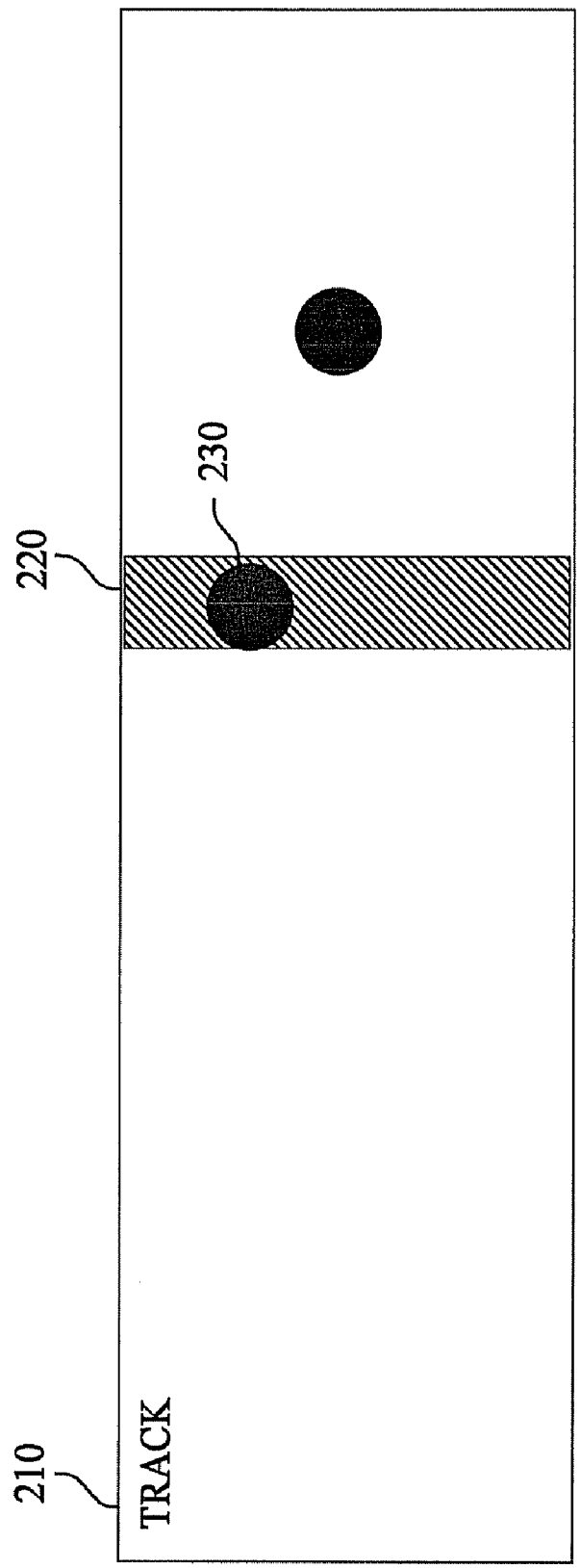

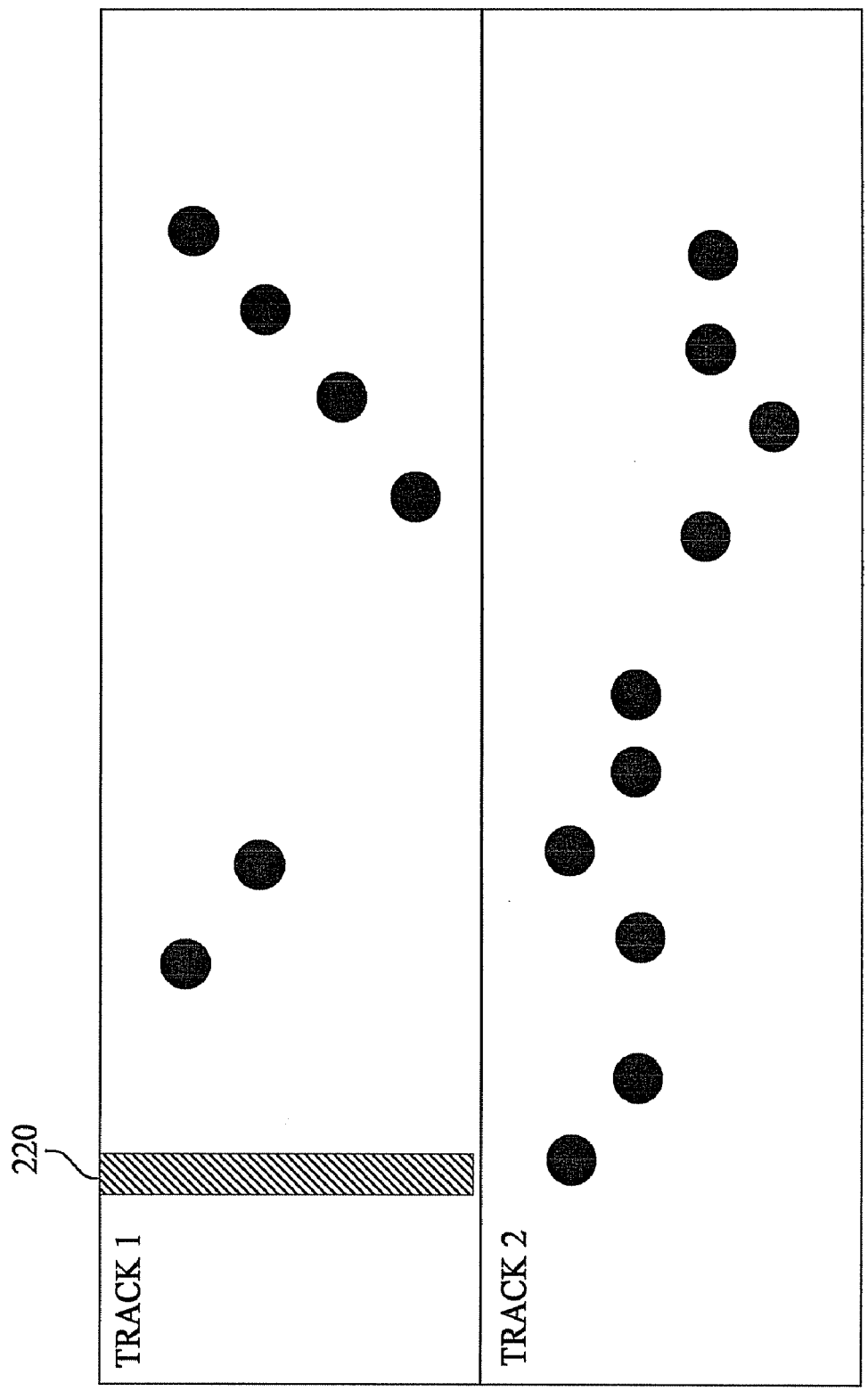

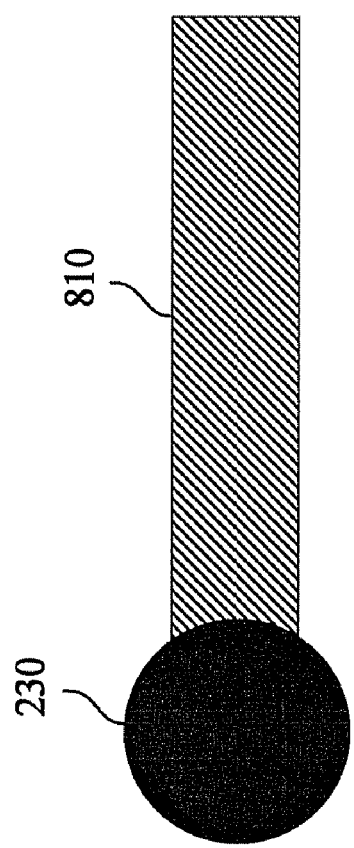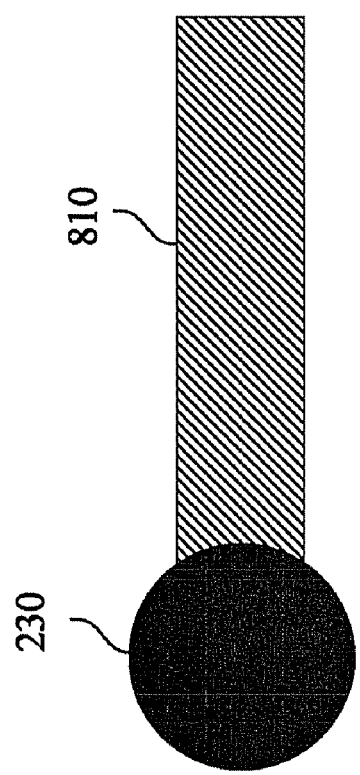
FIG. 8

METHOD FOR PROVIDING AUDIO GAME, APPARATUS AND COMPUTER-READABLE RECORDING MEDIUM WITH PROGRAM THEREFOR

TECHNICAL FIELD

The present disclosure relates to a method for providing an audio game, apparatus and computer-readable recording medium with program therefor. More particularly, the present disclosure relates to a method for providing an audio game, apparatus and computer-readable recording media with program therefor. "Audio game" as used herein is meant to include general electronic games that present audio such as a part of an audio/video game and an electronic audio game as well as "audio game" by the traditional definition.

The disclosed game apparatus has a touch screen for generating player selected music and its music related tracks on which a number of index marks are arranged in a predetermined pattern in relation to the music and a timeline is moved in a predetermined direction until it overlaps with the arranged index marks, and when a positional value is received corresponding to the index marks from the touch screen by the player's performance a preset performance sound that corresponds to its index mark is produced. Also provided are a method for providing an audio game and computer-readable recording medium with program therefor.

BACKGROUND OF THE DISCLOSURE

Recently, the majority of electronic audio games let a player select the music to play and display falling index marks of a matching music sheet, when the player is supposed to correctly hit the index marks on a keyboard of his or her personal computer or buttons of an arcade for the falling index marks trying to successfully play the music. I.e., in order to play the music the player must use the on-board game buttons, instruments keyboards, a drum or drum system, or other types of control means for hitting the same in a timed manner when a music sheet index mark descends on the display down to its stationary evaluation area with the area showing a match with the index mark.

However, in the case of conventional game systems to run audio games, the display and control means are separated hindering a novice player to recognize from the display the timing of the stationary evaluation area showing a match with the music sheet index mark, when the player should hit the control means. Not only the difficulty of the player to know each time when a new index mark appears in the conventional audio games, but also there were the disadvantage of difficulty of the player to grasp the timing of the overlapped moment between the music sheet index mark and the evaluation area indication.

DISCLOSURE OF THE INVENTION

In order to solve the above problem, the present disclosure provides a method for providing an audio game, apparatus and computer-readable recording media with program therefor wherein the game apparatus has a touch screen for generating player selected music and its music related tracks on which a number of index marks are arranged in a predetermined pattern in relation to the music and a timeline is moved in a predetermined direction until it overlaps with the arranged index marks, and when a positional value is received corresponding to the index marks from the touch screen by the player's performance a preset performance sound that corresponds to its index mark is produced. With the present disclosure, the player will have an advantage of foreseeing what subsequent track index mark will come after an end of one track in order to help the player to prepare for the next index mark to touch and clearly prompts the player to touch the index mark until more precise moment.

In one embodiment of the present disclosure, there is provided an apparatus for providing an audio game comprising: a memory for temporarily storing data generated during execution of an audio game program or saving user inputted data; a display for outputting message information generated during execution of the audio game program; a touch screen for delivering positional values corresponding to user touches on the screen, an audio output for converting audio signals depending on the audio game program into audible sounds and outputting the same; and a controller for controlling the audio signals to be outputted through the audio output and outputting tracks associated with the audio signals through the display, each of the tracks having a visible timeline movable across thereof and predetermined specifically figured index marks arranged thereon in a predetermined pattern depending on the audio signals, whereby when the timeline moves on the track in a predetermined direction to overlap the prearranged index marks and upon receiving the positional values from the touch screen corresponding to the index marks the controller outputs predetermined performance sounds that correspond to the index marks.

In another embodiment of the present disclosure, there is provided a method for providing an audio game comprising: outputting audio signals through an audio output; outputting tracks associated with the audio signals through a display; arranging predetermined specifically figured index marks on the tracks in a predetermined pattern depending on the audio signals; moving a timeline across the tracks in a predetermined direction; receiving the positional values from a touch screen corresponding to the arranged index marks when the timeline overlaps the index marks; and controlling predetermined performance sounds to be outputted corresponding to the index marks.

In yet another embodiment of the present disclosure, there is provided a computer-readable recording medium with programmed instructions for executing functions of an apparatus for providing an audio game, the functions comprising: a function to output audio signals through an audio output; a function to output tracks associated with the audio signals through a display; a function to arrange predetermined specifically figured index marks on the tracks in a predetermined pattern depending on the audio signals; a function to move a timeline across the tracks in a predetermined direction; a function to receive the positional values from a touch screen corresponding to the arranged index marks when the timeline overlaps the index marks; and a function to control predetermined performance sounds to be outputted corresponding to the index marks.

As described above, the disclosed game apparatus has the touch screen for generating player selected music and its music related tracks on which a number of index marks are arranged in a predetermined pattern in relation to the music and a timeline is moved in a predetermined direction until it overlaps with the arranged index marks, and when a positional value is received corresponding to the index marks from the touch screen by the player's performance a preset performance sound that corresponds to its index mark is produced. Also, according to the present disclosure, the tracks are outputted as they are classified into a track 1 and a track 2 and the timeline is controlled to initiate at the track 1 and connect to the track 2 so that upon reaching an end at the track 2 the track 1 ensues in a repeating alternate manner, whereby the player can foresee the subsequent track at an end of one track.

In addition, the present disclosure outputs a multitude of the index marks with index mark links connecting them together to facilitate that the player knows the next index mark to touch.

Further, according to the present disclosure, an extension line is outputted at the index mark so that it extends in the same direction as the timeline, and for the duration of time to receive a positional value of the index mark from the touch screen under the overlap between the timeline and the extension line the performance sound for the index mark may be outputted, whereby the player can precisely grasp until what time the index mark must be touched.

Additionally, according to the present disclosure, a plurality of extra index marks may be outputted on the extension line for additional touches, and if timely supplied with a positional value for the index mark from the touch screen whenever the timeline overlaps the respective plural extra index marks, the disclosed apparatus can control to intermittently output a performance sound corresponding to its index mark, whereby the apparatus advantageously prompts the player to perform consecutive operations in an intuitive manner. In addition, this may help the player in performing the consecutive touching more easily in a specific section.

Also, according to the present disclosure, the index marks may be outputted on the track with drag links connecting between the index marks, and for the duration of time to receive a positional value of the drag link from the touch screen under the overlap between the timeline and the drag link, a performance sound may be outputted corresponding to the drag link, whereby allowing the player to employ drag operations over a mere touch operation in the performance with the continuous sound of music.

Additionally, according to the present disclosure, drag extension lines may be outputted in the predetermined direction of movement of the timeline following the respective index marks, and for the duration of time to receive a positional value of the drag extension line from the touch screen under the overlap between the timeline and the drag extension line a performance sound may be outputted corresponding to the drag extension line, whereby allowing the player to employ drag operations over a mere touch operation while incorporating the duration of sound to the performance of a particular tune.

In addition, according to the present disclosure, curved drag extension lines are generated in the predetermined direction of movement of the timeline following the respective index marks, and for the duration of time to receive a positional value of the curved drag extension line from the touch screen under the overlap between the timeline and the curved drag extension line a performance sound may be outputted corresponding to the curved drag extension line, whereby the volume or equalizer of the sound can be controlled in accordance with the curvature of the curved drag extension line.

And, a specified touch area and a specified touch index mark may be generated on the track and when the timeline moves to overlap the specified touch index mark and upon receipt of the positional value of the specified touch area from the touch screen, whereby a performance sound may be outputted corresponding to the specified touch index mark.

BRIEF DESCRIPTION OF THE DRAWINGS

The above and other objects, features and advantages of the present disclosure will be more apparent from the following detailed description taken in conjunction with the accompanying drawings, in which:

FIG. 2 illustrates a method for providing an audio game according to an embodiment of the present disclosure;

FIG. 3 illustrates a method for providing an audio game on track 1 and track 2 according to an embodiment of the present disclosure;

FIG. 8 illustrates drag links according to another embodiment of the present disclosure;

DETAILED DESCRIPTION OF THE EXEMPLARY EMBODIMENTS

Figure 1:
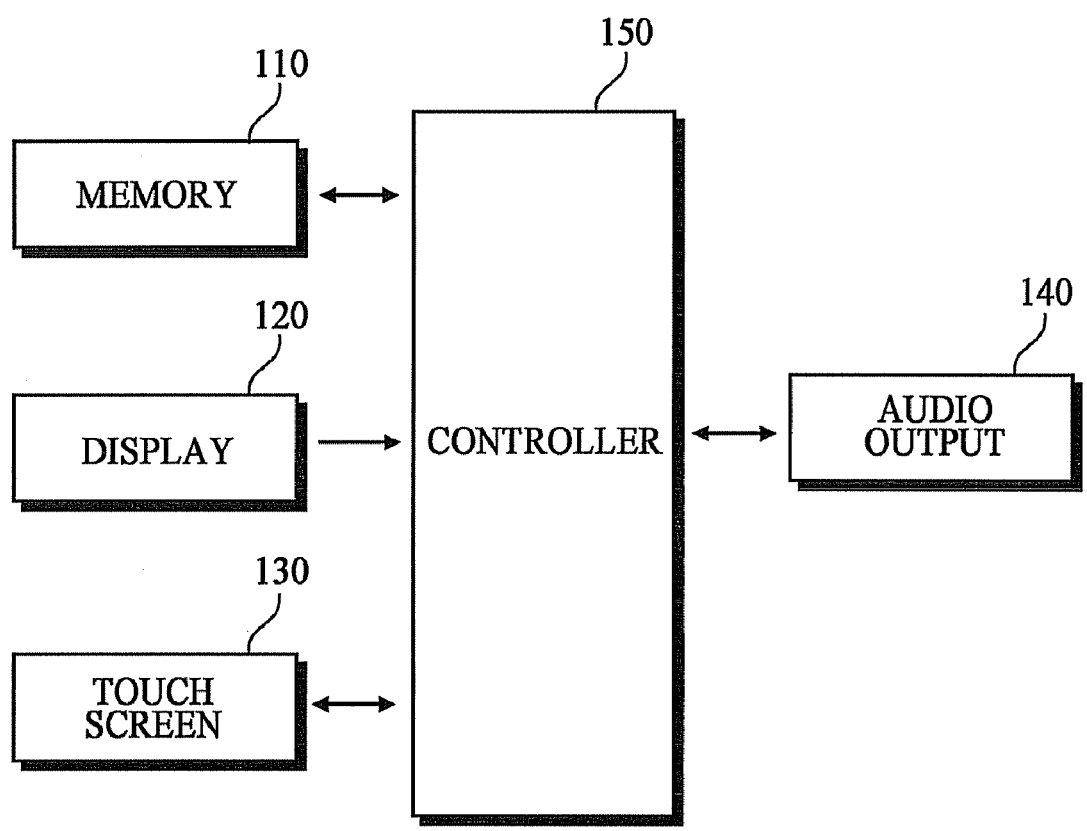
FIG. 1 is a schematic block diagram of a system for providing audio games according to an embodiment of the present disclosure.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

FIG. 1 is a block diagram for schematically showing a system for providing an audio game according to a first embodiment of the present disclosure. The present audio game system comprises a memory 110, a display 120, a touch screen 130, an audio output 140, and a controller 150. These exemplary components are not so limited by the present audio game system. Rather, there may be additions, omissions or modifications of components without departing from the substantial character of the present disclosure as will be evident to one skilled in the art.

Memory 110 stores data generated during an execution of audio game program temporarily or it stores user-input data. Display 120 functions to output message information generated during the execution of audio game program. Touch screen 130 performs to deliver a positional value corresponding to the user's touching location on screen 130. Touch screen 130 herein is equipped with a special input device for receiving a user's location of touch with a finger or a particular object like a pen that replaces a keyboard to allow interfacing with the system through direct manipulation of the on-screen characters or specified areas so that the touched area is identified and a specified action is performed by a stored software.

Touch screen 130 may then be installed over display 120 to perform its functions and it may be implemented in a resistive overlay, capacitive overlay, infrared beam, surface acoustic wave type or others.

Of the resistive touch screen, where the overlay portion abuts an underside glass is sensed as a touch signal resulting in a low durability with a low cost although it is popular due to a good tactile feel of touching and employed by PDAs (Personal Digital Assistants), GPS, home automation systems, PMS (Portable Multimedia Players), cellular phones, LCDs, DMB (Digital Multimedia Broadcasting) phones, lottery terminals, web pads etc.

In addition, the capacitive type provides a weak electric current across the screen, which gives a drain point under a touch exclusively by a conductive object to permit the current flow, which is then recognized as a legitimate input touch as mainly used in European ATMs (Automatic Teller Machines).

Further, the infrared (IR) and surface acoustic wave (SAW) types respectively beam infrared rays and acoustic waves across the screen surface to provide square lattice where the user touches a square by a finger tip or other specified objects interfering the beam which is interpreted as a local pointer causing recognition of the corresponding touch as is mainly utilized in South Korean ATMs.

Audio output 140 functions to convert audio signals in accordance with a particular audio game program into audible sounds before producing thereof. Controller 150 in accordance with the present disclosure is adapted to control an output of the audio signals through audio output 140 and outputs on display 120 an audio signal-related track 210 (see FIGS. 2A and 2B) on which a plurality of index marks 230 are arranged. Index marks 230 may take a preset figure and arranged in a preset pattern in accordance with the audio signals. There is provided a timeline 220 that moves over track 210 in a preset direction to overlap the arranged index mark 230 at which time if a positional value corresponding to the index mark 230 is received from touch screen 130, controller 150 works to generate a preset performance sound corresponding to the index mark. Here, track 210 means an area representing a measure of a musical score or a score portion corresponding to a preset rhythm.

For example, the time for timeline 220 to move from start to finish may be set to equal to the time of a musical measure or duple or more time of a musical score, and musical notes of the score may be visualized as index marks 230 on track 210. Therefore, as music is completely played index marks 230 on track 210 as it progresses may be rearranged numerous times.

Controller 150 according to the present invention performs to control the moving speed of timeline 220 depending on the audio tempo of the audio signal. Controller 150 of the present embodiment may move timeline 220 on track 210 in at least one of horizontal, vertical and diametrical directions. Controller 150 outputs track 210 on display 120 and controls so that timeline 220 starts from a track 1 and continues to a track 2 and when timeline 220 terminates at the track 2 it alternately continues to the track 1.

In addition, when timeline 220 finishes at the track 1 and then connects to the track 2, controller 150 has the end of the track 1 synchronized with the start of track 2 and repeats such synchronization thereafter.

Controller 150 further performs to make timeline 220 move in reverse directions on the track 1 and track 2, respectively. Controller 150 according to the present embodiment rearranges index marks 230 on the track 1 and track 2 in a preset pattern depending on the audio signal. Indication marks 230 may be represented by at least one of circle, triangle, rectangle and star shape among others.

Figure 4:
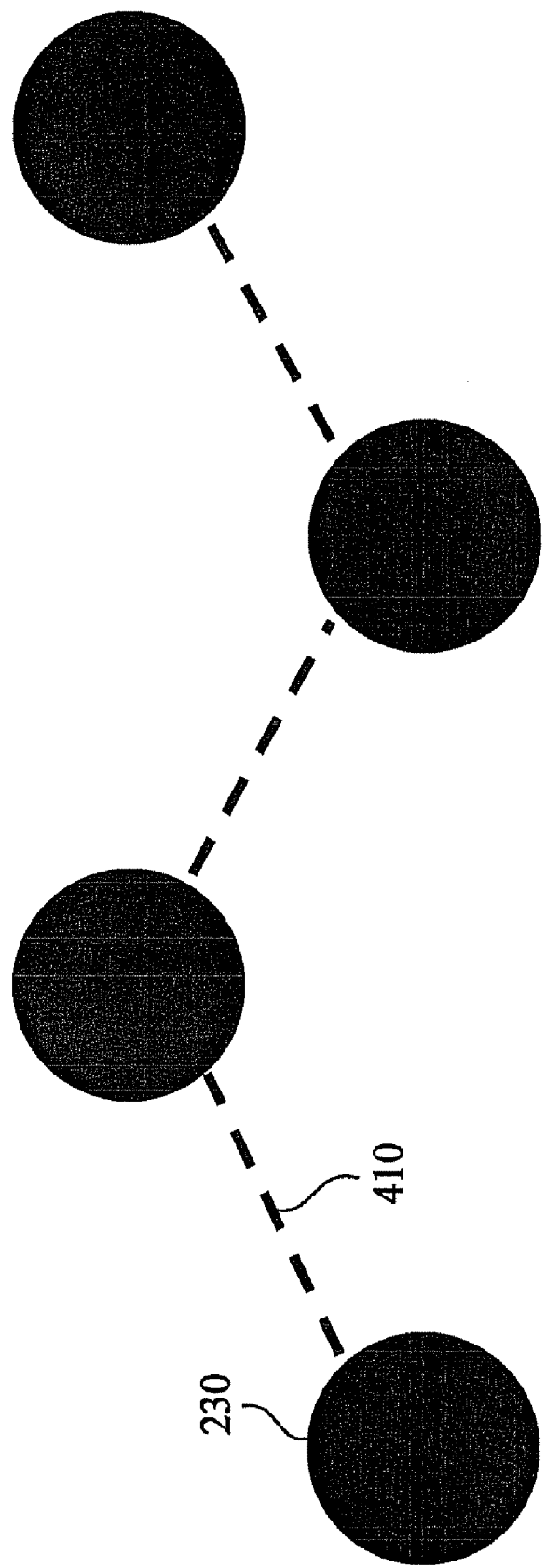
FIG. 4 illustrates index mark links according to an embodiment of the present disclosure.
Figure 5:
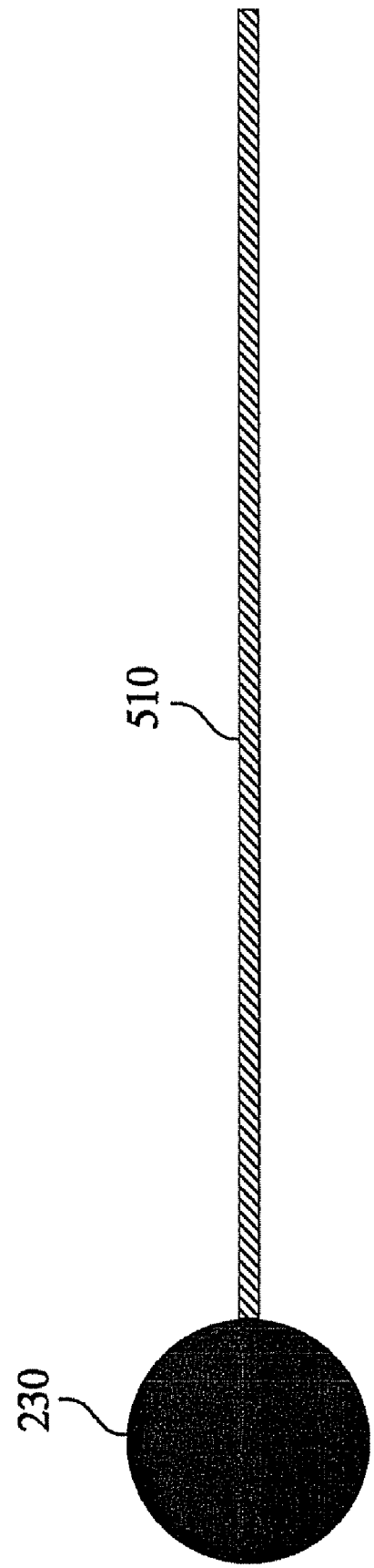
FIG. 5 illustrates an extension line according to another embodiment of the present disclosure.

Controller 150 may output multiple index marks as connected by an index mark link 410 as shown in FIG. 4. Index mark link 410 may comprise dotted lines of a predetermined thickness. Referring to FIG. 5, controller 150 may also display an extension line 510 from index mark 230 in the same direction of movement of timeline 220 and in case timeline 220 moves in the preset single direction and crosses extension line 510 it checks whether a positional value is inputted from touch screen 130 with respect to the crossing area between timeline 220 and extension line 510 and if the input were made it controls a performance sound to be outputted corresponding to index mark 230 that corresponds to the start of extension line 510. Extension line 510 may be expressed by a thin solid line with a predetermined thickness.

Figure 6:
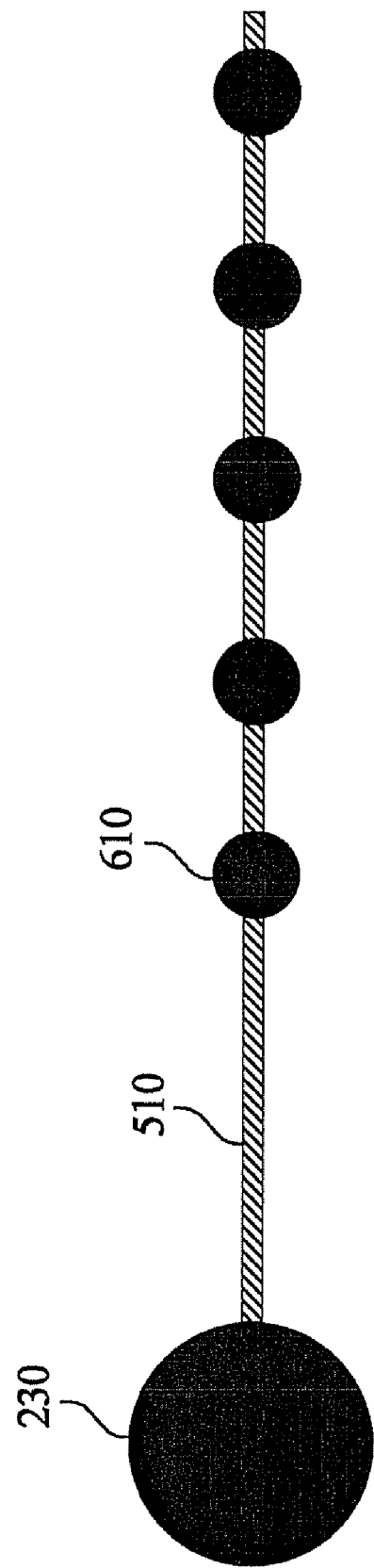
FIG. 6 illustrates extra index marks according to an embodiment of the present disclosure.

As shown in FIG. 6, controller 150 may also display a plurality of extra index marks 610 on extension line 510 for additional touches and may be supplied with a positional value for the index mark from touch screen 130 at the time when timeline 220 overlaps the respective plural extra index marks 610 as it controls to intermittently output a performance sound corresponding to the index mark 230. Extra index marks 610 may be set to be smaller than the index mark.

Figure 7:
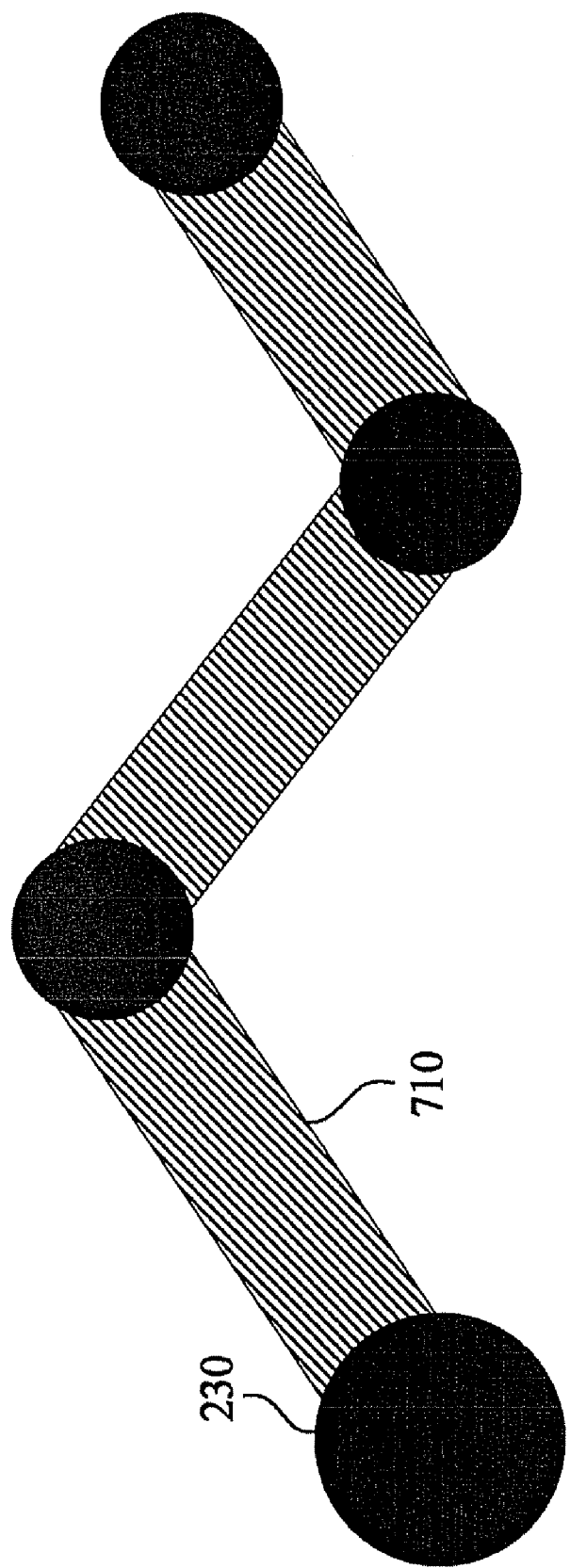
FIG. 7 illustrates drag links according to an embodiment of the present disclosure.

As shown in FIG. 7, controller 150 of this embodiment may output on track 210 index marks 230 with drag links 710 connecting therebetween and in case timeline 220 moves in the predetermined direction and crosses drag link 710 it checks whether a positional value is inputted from touch screen 130 in relation to the crossing area between timeline 220 and drag link 710 and if the input were made it controls a performance sound to be outputted corresponding to index mark 230 that corresponds to the start of drag link 710. Drag link 710 may be expressed by a thick solid line with a predetermined thickness.

As shown in FIG. 8, controller 150 of this embodiment may also output drag extension lines 810 in the predetermined direction of movement of timeline 220 for the respective index marks 230 and in case timeline 220 moves in the preset direction and crosses drag extension line 810 it checks whether a positional value is inputted from touch screen 130 in relation to the crossing area between timeline 220 and drag extension line 810 and if such input were received it controls a performance sound to be outputted corresponding to index mark 230 that corresponds to the start of drag extension line 810. Drag extension line 810 may be set so that a same audio signal corresponding to the related index mark 230 is performed for a specific period. In other words, if the user touched the index mark 230 that entered timeline 220 and continued to touch and drag the drag extension line 810 that is within timeline 220 as it moves, then the corresponding performance sound to the related index mark 230 is outputted in continuation for an extended period.

Figure 9:
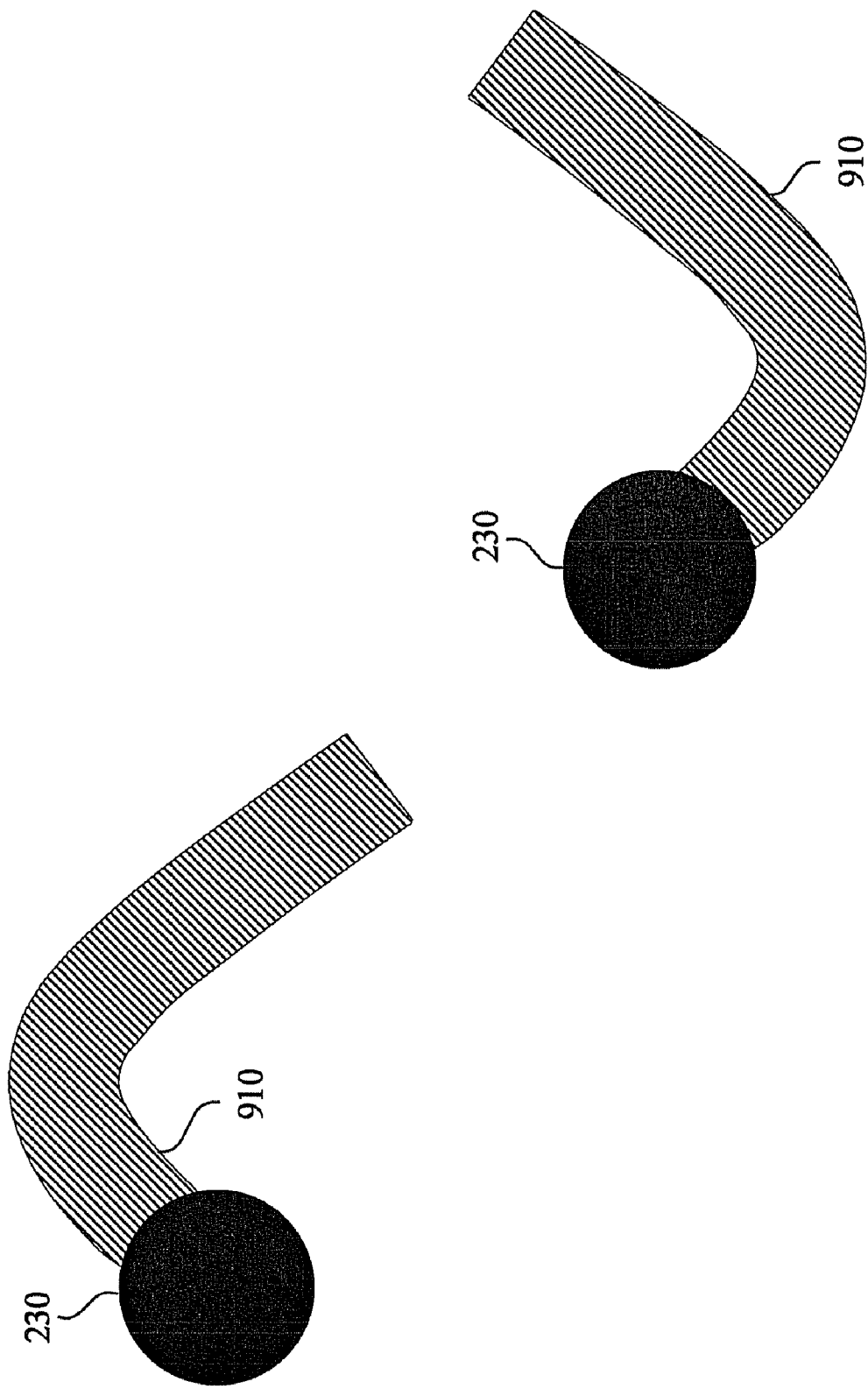
FIG. 9 illustrates curved drag links according to an embodiment of the present disclosure.

As shown in FIG. 9, controller 150 of this embodiment may also output curved drag extension lines 910 in the predetermined direction of movement of timeline 220 for the respective index marks 230 and in case timeline 220 moves in the predetermined direction and crosses curved drag extension line 910 it checks whether a positional value is inputted from touch screen 130 with respect to the crossing area between timeline 220 and curved drag extension line 910 and if such input were received it controls a performance sound to be outputted corresponding to curved drag extension line 910.

Figure 10:
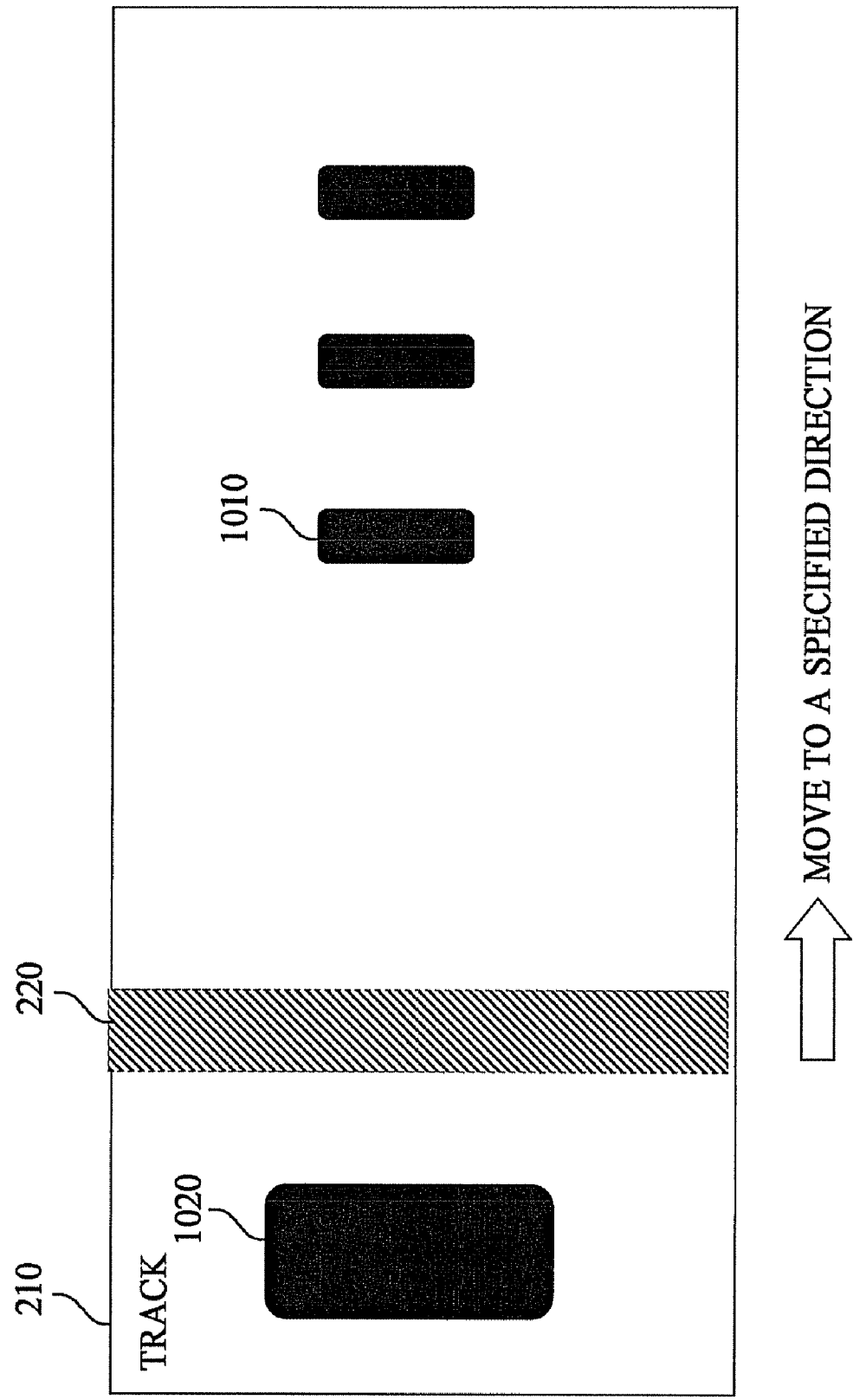
FIG. 10 illustrates a specified touch area and a specified touch index mark according to an embodiment of the present disclosure.

Controller 150 according to the present embodiment may perform to control the volume or equalizer of an audio outputted in accordance with the curvature of curved drag extension line 910. As shown in FIG. 10, controller 150 may further output on track 210 a specified touch area 1020 and specified touch index marks 1010 and in case timeline 220 moves to overlap one of the specified touch index marks 1010 and a positional value is inputted from touch screen 130 with respect to the specified touch area 1020 it controls a performance sound to be outputted corresponding to the specified touch index mark 1010.

Furthermore, controller 150 may calculate user's scores based on the synchronized timing of the positional input from touch screen 130 with respect to index mark 230 displayed on track 210 where in case the calculated score exceeds a preset score it can output through display 120 a new audio signal related track (next stage).

Depending on the display 120 resolution or size, controller 150 of the present embodiment may output tracks 210 classified into the first to Nth tracks so that these tracks scroll from bottom to top.

In case timeline 220 moves on track 210 in a predetermined direction to overlap the arranged plural index marks 230 and a number of positional values are inputted from touch screen 130 corresponding to the index marks 230, controller 150 of the present embodiment may control different predetermined performance sounds to be outputted corresponding to the plural index marks 230.

Controller 150 of this embodiment may also control a performance sound to be outputted corresponding to index mark 230 that corresponds to the start of extension line 510 or drag extension line 810 while checking for the presence of overlapping between any additional index marks and timeline 220 and if there were such index marks it receives a positional value corresponding to the additional overlapping index marks and outputs a preset performance sound that corresponds to the additional overlapping index marks.

FIG. 2 illustrates a method for providing an audio game according to an embodiment of the present disclosure.

As shown in FIG. 2A, controller 150 works to output audio signals through audio output 140 and the audio-related track 210 through display 120. The audio signal herein may be a music tune and track 210 may be shaped to match a music score corresponding to the tune. Controller 150 arranges on track 210 a plurality of particularly figured index marks 230 in a predetermined pattern according to the audio signal. In other words, the predetermined pattern according to the audio signal may be one that matches with the musical note or scale of the score of the selected tune.

In case timeline 220 moves on track 210 in a predetermined direction to overlap the arranged index marks 230 and a number of positional values are inputted from touch screen 130 corresponding to the index marks 230, controller 150 may output predetermined performance sounds corresponding to the index marks 230.

For example, the present audio game method may be configured so that the user may touch the musical note or scale of the score of the selected tune to have the corresponding tune performed.

Assuming timeline 220 moves horizontally from left to right as shown in FIG. 2A, it eventually overlaps one of the plurality of index marks 230 arranged on track 210 in the predetermined pattern in accordance with the audio signal, when the user is supposed to touch the timeline-overlapping index mark 230, thereby outputting the preset performance sound corresponding to the index mark. I.e., the user is allowed to select a specific tune from a stored audio signal listing and controller 150 is adapted to output an audio signal (background music) specific to a particular tune where the user is supposed to touch the index mark 230 overlapping timeline 220, thereby the preset performance sound for the index mark is outputted along with the background music.

Although FIG. 2A conveniently illustrates the horizontal movement of timeline 220, the present disclosure may be implemented to move timeline 220 in at least one of the horizontal, vertical and diagonal directions. In addition, the moving speed of timeline 220 shown in FIGS. 2A and 2B may be adjusted following the tempo of the audio signal. For example, if the user's selection were a dance tune, the timeline 220 may be made to move at a very high speed following the audio signal tempo whereas if a ballad tune were selected the timeline 220 movement may be slowed in response to the slower audio signal tempo. Although index marks 230 in the present embodiment are conveniently depicted in a circular shape, they may be differently expressed in the implementation of the present disclosure with shapes of a circle, triangle, rectangle and/or star.

FIG. 3 illustrates a method for providing an audio game on track 1 and track 2 according to an embodiment of the present disclosure. As shown in FIG. 3, track 210 may be outputted with tracks 1 and 2 divided where timeline 220 may start from track 1 and continue to track 2. Also, upon completion of the travel of timeline 220 at track 2 it may be controlled to alternate with track 1 to repeat the travel in cycle. For example, timeline 220 may start from the left side of track 1 and pass its right side before restarting at the left side of track 2 and then pass its right side where timeline 220 returns to the left side of track 1. Therefore, until the end of the user's tune selection the timeline cycles alternately between the track 1 and track 2 where the track swept by the timeline comes to display rearranged index marks in a preset pattern in accordance with the user's selection of tune (audio signal).

FIG. 4 illustrates index mark links according to an embodiment of the present disclosure. As shown in FIG. 4, controller 150 outputs multiple index marks 230 with index mark links 410 connecting adjacent index marks 230 together. Index mark link 410 may be a dotted line with a preset thickness. Therefore, when a multitude of index marks 230 are outputted, it will be easier for the user to visually pick the next index mark to touch from following the lead of index mark links 410 as shown in FIG. 4.

FIG. 5 illustrates an extension line 510 according to another embodiment of the present disclosure. As illustrated, controller 150 outputs extension line 510 at index mark 230 so that it extends in the same direction of timeline 220, and when timeline 220 moves in the preset direction to cross extension line 510 and controller 150 ascertains that a positional value is inputted from touch screen 130 for the overlapping area between timeline 220 and extension line 510, it outputs the performance sound for the index mark 230 that corresponds to the start of extension line 520. Extension line 510 may be expressed as a solid line with a preset thickness.

For example, if T is the overlapping period between timeline 220 and extension line 510 and T' is the duration of receiving from touch screen 130 the positional value for the index mark 230, controller 150 performs to output the performance sound corresponding to the index mark 230 for the duration of T' on the condition that T>T', T<T' or T=T'. I.e., upon indication of extension line 510 as in FIG. 5, the user may first touch the index mark 230 connected with extension line 510 and maintain the depression until the expiration of the extension line 510 or for about three seconds as the performance sound corresponding to the touched index mark 230 is controlled to be outputted for the three seconds.

FIG. 6 illustrates extra index marks 610 according to an embodiment of the present disclosure. As illustrated, controller 150 outputs along extension line 510 a number of extra index marks 610 for additional touches, and each time when timeline 220 overlaps the respective extra index marks 610 it is supposed to receive from touch screen 130 the positional value for the index mark 230 and then output performance sound for the index mark intermittently. Extra index marks 610 may be set to be smaller than the index mark 230. I.e., when extra index marks 610 are displayed on extension line 510 for additional touches and at the moment timeline 220 overlaps index mark 230, the user may first touch the index mark 230 connected with extension line 510 and repeat touching the same index mark 230 each time when timeline 220 overlaps each of the extra index marks 610, thereby produce the performance sound corresponding to the index marks 230 continuously.

At the same time, when timeline 220 overlaps index mark 230 and extra index marks 610 on extension line 510, the user may be expected to keep touching one index mark 230 while additionally touching the same mark 230 with another finger or hand each time timeline 220 overlaps the respective extra index marks 610 although it is within the scope of the present disclosure to adapt the audio game method to have the user touch index mark 230 for a short time and repeat the same each time the timeline 220 overlaps extra index marks 610.

In other words, extra index marks 610 on extension line 510 becomes intuitive targets for the consecutive touching operations to facilitate the actual user's touches along extension line 510.

FIG. 7 illustrates drag links 710 according to an embodiment of the present disclosure. As illustrated, controller 150 is adapted to display index marks 230 outputted on track 210 with drag links 710 connecting index marks 230 and when timeline 230 moves in a preset direction to overlap drag link 710, it checks for an input of a positional value from touch screen 130 for the overlap between timeline and drag link 710 and upon confirmation of such input generates a performance sound for the index mark 230 that corresponds to the start of drag link 710. Drag link 710 may be expressed as a solid line with a predetermined thickness.

For example, if the user touches index mark 230 that came within timeline 220 and follows drag link 710 as it is overlapped by timeline 230 by keeping touch with and drag along drag link 710 within timeline 230, a performance sound may be controlled to be outputted as a default for the index mark 230 that corresponds to the start of drag link 710, or as desired various performance sounds may be outputted depending on the respective drag links 710.

I.e., the user will be allowed to employ the drag maneuver along drag link 710 rather than mere touches in order to output consecutive sounds.

For example, if the user touches index mark 230 that came within timeline 220 and follows drag link 710 as it is overlapped by timeline 230 by keeping touch with and drag along drag link 710 within timeline 230, a performance sound may be controlled to be outputted as a default for the index mark 230 that corresponds to the start of drag link 710 or various performance sounds may be outputted as desired depending on the respective drag links 710.

FIG. 8 illustrates drag links 810 according to another embodiment of the present disclosure. As illustrated, controller 150 is adapted to display drag extension lines 810 for the respective index marks 230 at the same side as the time line 220 movement and when timeline 220 moves in a preset direction to overlap drag extension lines 810, it checks for an input of a positional value from touch screen 130 for the overlap between timeline 220 and drag extension line 810 and upon confirmation of such input generates a performance sound for the index mark 230 that corresponds to the start of drag extension line 810. Drag extension line 810 may be set in relation to the duration of a specific sound of the audio signal. I.e., the user will be allowed to perform the specific sound for its designated duration with a drag maneuver along drag extension line 810 rather than mere touch operations.

For example, if the user touches index mark 230 that came within timeline 220 and follows drag extension line 810 as it is overlapped by timeline 230 by keeping touch with and drag along drag extension line 810 within timeline 230, a performance sound may be controlled to be outputted as a default for the index mark 230 that corresponds to the start of drag extension line 810 or various performance sounds may be outputted as desired depending on the respective drag extension line 810.

On the other hand, as shown in FIG. 5 or 8, controller 150 works to output a performance sound for the index mark 203 corresponding to the start of extension line 510 or drag extension line 810 while checking for the presence of index mark 230 that further overlaps timeline 220 and upon confirmation of such index mark 230 it is supposed to receive from touch screen 130 a positional signal for the further overlapping index mark 230 and controls a preset performance sound to be outputted corresponding to the same index mark 230.

For example, if the player puts a long touch on extension line 510 or drag extension line 810 to output a prolonged sound as shown in FIG. 5 or 8 and timeline 220 comes to overlap index mark 230 that prompts consecutive music plays such as in a drum session, the player will be required to keep the long touch on extension line 510 or drag extension line 810 while additionally operating touch screen 130 resulting in a multi-touch manipulation.

FIG. 9 illustrates curved drag links 910 according to an embodiment of the present disclosure. As illustrated, controller 150 is adapted to control the sound volume or an equalizer following the curvatures of curved drag extension lines 910. I.e., when the curvature of curved drag extension line 910 is directed upward as shown in the right side one of FIG. 9, the user is allowed to turn up the volume of the performance sound gradually while the user may turn it down gradually for index mark 230 with the downwardly curved drag extension line 910 at the left side. It is possible to associate the curvature (up or down) precisely with the sound pitch or tone in proportion in order to effectuate an equalizer for providing a variety of sound sources.

FIG. 10 illustrates a specified touch area and a specified touch index mark according to an embodiment of the present disclosure. As illustrated, controller 150 outputs on track 210 a specified touch area 1020 and specified touch index marks 1010 and when timeline 220 moves to overlap specified touch index mark 1010 and upon receipt of the positional value of specified touch area 1020 from touch screen 130 it outputs a performance sound that corresponds to specified touch index mark 1010.

Meanwhile, as shown in FIG. 10, controller 150 outputs on track 210 the specified touch area 1020 and specified touch index marks 1010 and when timeline 220 moves to overlap specified touch index mark 1010 and upon receipt of the positional values of specified touch area 1020 and specified touch index mark 1010 from touch screen 130 it may output their corresponding performance sounds. I.e., rather than merely touching an index mark, the user will be able to touch specified touch area 1020 at an overlap between timeline 220 and touch index mark 1010 to perform a specified music sound as shown in FIG. 10.

Figure 11:
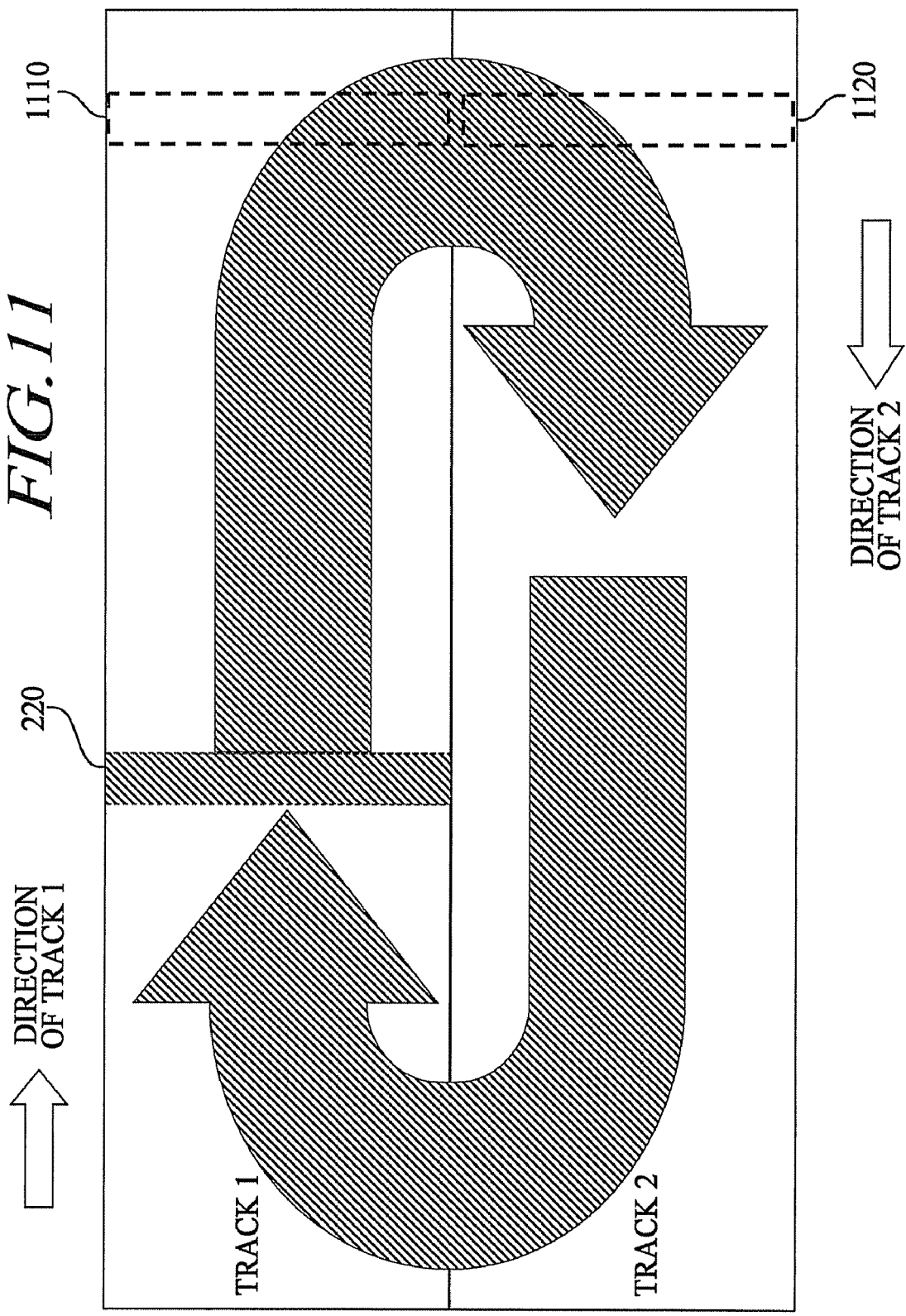
FIG. 11 illustrates the direction of movement of a timeline according to an embodiment of the present disclosure.

FIG. 11 illustrates the direction of movement of a timeline according to an embodiment of the present disclosure. As shown, when timeline 220 ends on track 1 and continues to track 2, controller 150 may overlap an end 1110 of track 1 with a start 1120 of track 2, thereby controlling the tracks 1 and 2 to be synchronized at their ends repeatedly. In addition, controller 150 performs to inverse the direction of timeline 220 as it transitions from track 1 to track 2. Specifically, if timeline 220 moves on track 1 from left to right and reaches end 1110, timeline transfers track 1 to track 2. At this time, controller 150 arranges timeline 220 to be at start 1120 precisely where track 1 has ended at 1110 and continues to move timeline 220 on track 2 from right to left.

Likewise, when timeline 220 on track 2 moves to the left end, it is controlled by controller 150 to transfer back to track 1 with timeline 220 now positioned on a starting area where track 2 has ended.

With the timeline 220 movement as in FIG. 11, no more is the hardship of the player to recognize newly arranged index marks 230 due to timeline 220 on track 210 moved only in one direction from the end of track 210 all the way back to its start halting the player undesirably long. In this way, the player may immediately recognize the index mark on track 2 from the end of track 1.

Figure 12:
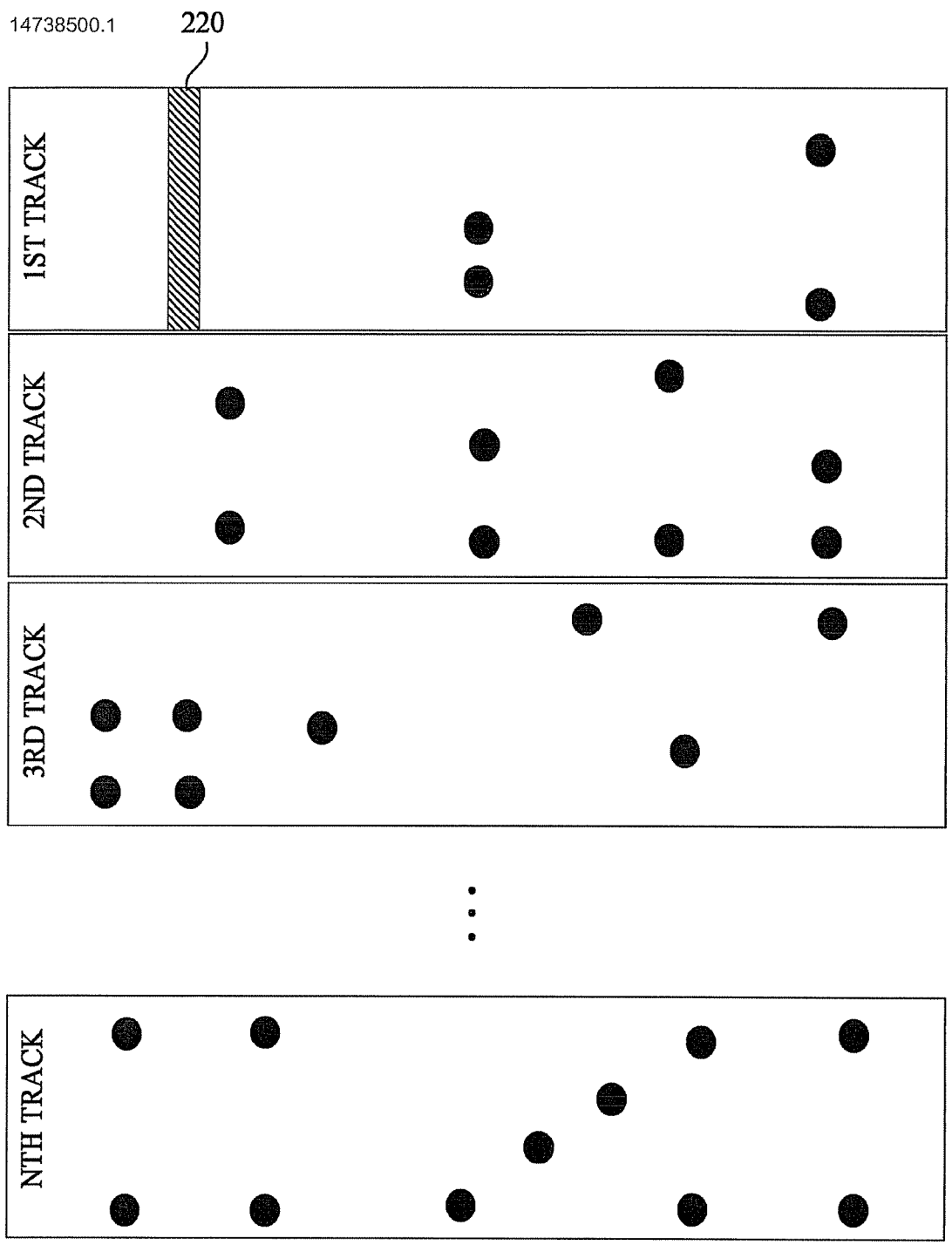
FIG. 12 illustrates multiple tracks generated depending on the resolution or size of a display according to an embodiment of the present disclosure.

FIG. 12 illustrates multiple tracks generated depending on the resolution or size of a display according to an embodiment of the present disclosure. As shown, depending on the display 120 resolution and/or size, controller 150 of the present embodiment may output tracks 210 classified into the first to Nth tracks so that these tracks scroll from bottom to top. I.e., controller 150 may output the multiple tracks (first to Nth tracks) on display 120 depending on its supported resolution and panel size so that the tracks are displayed all at once while the subsequent tracks scroll bottom up.

Meanwhile, when timeline 220 moves on track 210 in the predetermined direction to overlap the prearranged multiple index marks 230 and receives from touch screen 130 a number of positional values corresponding to the index marks, controller 150 works to output a number of preset performance sounds corresponding to index marks 230.

For example, as shown in FIG. 12, in case timeline 120 overlaps two of index marks 230 at the same time, the player is supposed to exert a multi-touch on both the index marks 230 at once, when controller 150 can output a preset performance sound that corresponds to the two index marks.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. An apparatus for providing an audio game comprising:
    a memory that at least one of:
        temporarily stores data generated during execution of an audio game program; and
        saves user inputted data;
    a display that outputs message information generated during execution of the audio game program;
    a touch screen that is installed on the display and delivers positional values corresponding to user touches on the touch screen;
    an audio output that:
        converts audio signals depending on the audio game program into audible sounds; and
        outputs the audible sounds; and
    a controller that:
        controls the audio signals to be outputted through the audio output;
        outputs one or more tracks associated with the audio signals on the display through the touch screen;
        arranges predetermined specifically figured index marks on each of the tracks in a predetermined pattern depending on the audio signals at fixed locations on the display through the touch screen;
        moves a visible timeline along one of the tracks in a predetermined direction on the display through the touch screen; and
        outputs a predetermined performance sound that corresponds to one of the index marks if the user is touching the touch screen at the location of the one of the index marks on the display which the moving timeline overlaps when the moving timeline overlaps the one of the index marks on the display.

2. The apparatus for providing an audio game in claim 1, wherein the controller sets the speed of the moving timeline in response to the tempo of the audio signals and moves the timeline with the set speed on the display.

3. The apparatus for providing an audio game in claim 1, wherein the controller moves the moving timeline along the track in at least one of horizontal, vertical, and diagonal directions.

4. The apparatus for providing an audio game in claim 1, wherein the controller:
    outputs the tracks through the display so that the tracks are classified into a track 1 and a track 2; and
    controls the timeline to initiate at the track 1 and connect to the track 2 so that upon reaching an end of the track 2, the moving timeline begins at the track 1 in a repeating alternate manner.

5. The apparatus for providing an audio game in claim 4, wherein upon connection of the moving timeline to the track 2 after reaching the end of the track 1, the controller controls the end of the moving timeline in the track 1 to overlap a start of the moving timeline in the track 2 and maintains the tracks 1 and 2 overlapped at their ends and starts in a repeating alternate manner.

6. The apparatus for providing an audio game in claim 5, wherein the controller controls the moving timeline to reverse direction at transitions between the tracks 1 and 2.

7. The apparatus for providing an audio game in claim 4, wherein the controller controls the index marks to be rearranged on the tracks 1 and 2 in predetermined patterns on the display in accordance with the audio signals.

8. The apparatus for providing an audio game in claim 1, wherein the controller outputs index mark links connecting ones of the index marks together on the display so that the user may visually pick the next index mark to touch from following the lead of index mark links.

9. The apparatus for providing an audio game in claim 1, wherein:
    the controller outputs an extension line starting at the one of the index marks and extending in the predetermined direction; and
    when the timeline crosses the extension line and the positional value from the touch screen indicates that the user is movably touching an area of overlap between the moving timeline and the extension line to the same direction as the predetermined direction of the timeline, the controller continuously outputs the predetermined performance sound for the one of the index marks while the user maintains the movable touching on the touch screen until the expiration of the extension line.

10. The apparatus for providing an audio game in claim 9, wherein:
the controller outputs extra index marks on the extension line for additional touches; and
when the positional value from the touch screen indicates that the user is movably touching an area of overlap between the timeline and one of the extra index marks, the controller intermittently outputs performance sounds corresponding to the index marks while the user maintains the movable touching on the touch screen until the expiration of the extension line.

11. The apparatus for providing an audio game in claim 1, wherein:
the controller outputs a drag link connecting the one of the index marks with a second one of the index marks; and
when the timeline moves in the predetermined direction and crosses the drag link and the positional value from the touch screen indicates that the user is movably touching an area of overlap between the moving timeline and the drag link, the controller outputs the predetermined performance sound as the user keeps the movable touching with and drag along drag link within the timeline.

12. The apparatus for providing an audio game in claim 1, wherein:
the controller outputs a drag extension line in the predetermined direction following the one of the index marks; and
when the timeline moves in the predetermined direction and crosses the drag extension line and the positional value from the touch screen indicates that the user is movably touching an area of overlap between the moving timeline and the drag extension line, the controller outputs the predetermined performance sound as the user keeps the movable touching with and drag along drag extension within the timeline.

13. The apparatus for providing an audio game in claim 12, wherein the drag extension line in the predetermined direction following the one of the index marks is set to correspond to a specific length of the predetermined performance sound.

14. The apparatus for providing an audio game in claim 1, wherein:
the controller outputs a curved drag extension line in approximately the predetermined direction following the one of the index marks; and
when the timeline moves in the predetermined direction and crosses the curved drag extension line and the positional value from the touch screen indicates that the user is movably touching an area of overlap between the moving timeline and the curved drag extension line, the controller outputs the predetermined performance sound as the user keeps the movable touching with and drag along drag extension within the timeline.

15. The apparatus for providing an audio game in claim 14, wherein the controller controls one of volume and equalization of the predetermined performance sound in accordance with a curvature of the curved drag extension line on the display in order to outputs the predetermined performance sound.

16. The apparatus for providing an audio game in claim 1, wherein:
the controller outputs a specified touch area and a specified touch index mark on the display; and
when the timeline overlaps the specified touch index mark and the positional value from the touch screen indicates that the user is movably touching an area of overlap of the moving timeline and the specified touch area, the controller outputs a performance sound that corresponds to the specified touch index mark.

17. The apparatus for providing an audio game in claim 1, wherein the controller classifies the tracks as first to Nth tracks on the display, causes the tracks scroll from bottom to top of the display based on at least one of resolution and size of the display and controls the moving timeline to reverse direction at transitions between one and the adjacent other of the tracks.

18. The apparatus for providing an audio game in claim 1, wherein when the moving timeline moves along the track in the predetermined direction and overlaps the index marks on the display and receives from the touch screen the positional values corresponding to the index marks, the controller outputs preset performance sounds corresponding to the index marks.

19. The apparatus for providing an audio game in claim 9 or 11, wherein:
the controller outputs a performance sound for the one of the index marks while checking for the presence of a second one of the index marks that overlaps the moving timeline; and
upon detection of the second one of the index marks overlapping the timeline, the controller outputs a predetermined performance sound corresponding to the second one of the index marks when the positional signal indicates that the user is movably touching an area of overlap between the moving timeline and the second one of the index marks.

20. A method for providing an audio game, the method comprising:
outputting audio signals through an audio output;
outputting tracks associated with the audio signals on a display;
arranging predetermined specifically figured index marks on the tracks in a predetermined pattern depending on the audio signals at fixed locations on the display;
moving a timeline across the tracks in a predetermined direction on the display;
receiving positional values from a touch screen installed over the display where the positional values correspond to touches of a user on the touch screen; and
when the positional values from the touch screen correspond to the index marks and the moving timeline overlaps the respective index marks on the display, controlling predetermined performance sounds to be outputted corresponding to the index marks.

21. A tangible non-transitory computer-readable recording medium with an executable program stored thereon, wherein the program instructs an apparatus for providing an audio game to execute the following steps:
outputting audio signals through an audio output;
outputting tracks associated with the audio signals on a display;
arranging predetermined specifically figured index marks on the tracks in a predetermined pattern depending on the audio signals at fixed locations on the display;
moving a timeline across the tracks in a predetermined direction on the display;
receiving positional values from a touch screen installed over the display where the positional values correspond to touches of a user on the touch screen; and
when the positional values from the touch screen correspond to the index marks and the moving timeline overlaps the respective index marks on the display, controlling predetermined performance sounds to be outputted corresponding to the index marks.

* * * * *